United States Patent
Benjamin et al.

(10) Patent No.: US 11,256,834 B2
(45) Date of Patent: Feb. 22, 2022

(54) ANALYZING A DESIGN SPACE TO EFFECT MORE EFFICIENT DESIGN SPACE EXPLORATION

(71) Applicant: AUTODESK, INC., San Rafael, CA (US)

(72) Inventors: David Benjamin, New York, NY (US); Danil Nagy, New York, NY (US); Lorenzo Villaggi, New York, NY (US)

(73) Assignee: AUTODESK, INC., San Rafael, CA (US)

( * ) Notice: Subject to any disclaimer, the term of this patent is extended or adjusted under 35 U.S.C. 154(b) by 568 days.

(21) Appl. No.: 15/979,432

(22) Filed: May 14, 2018

(65) Prior Publication Data

US 2018/0336289 A1 Nov. 22, 2018

Related U.S. Application Data

(60) Provisional application No. 62/507,141, filed on May 16, 2017.

(51) Int. Cl.
*G06F 30/17* (2020.01)
*G06F 30/13* (2020.01)
*G06F 111/06* (2020.01)

(52) U.S. Cl.
CPC ............. *G06F 30/17* (2020.01); *G06F 30/13* (2020.01); *G06F 2111/06* (2020.01)

(58) Field of Classification Search
CPC ....... G06F 30/17; G06F 30/13; G06F 2111/06
See application file for complete search history.

(56) References Cited

U.S. PATENT DOCUMENTS

| 6,963,823 | B1 * | 11/2005 | Abraham | G06F 30/327 |
| | | | | 703/2 |
| 8,006,220 | B2 * | 8/2011 | McConaghy | G06F 30/36 |
| | | | | 716/132 |
| 8,024,682 | B2 * | 9/2011 | McConaghy | G06F 30/36 |
| | | | | 716/106 |
| 8,037,435 | B1 * | 10/2011 | Chesal | G06F 30/34 |
| | | | | 716/104 |

(Continued)

OTHER PUBLICATIONS

Yannou, B., et al. "Faster Generation of Feasible Design Points" ASME Int'l 2005 Design Engineering Technical Conf. & Computers & Engineering Conf. IDETC'05 (2005) (Year: 2005).*

(Continued)

*Primary Examiner* — Jay Hann
(74) *Attorney, Agent, or Firm* — Artegis Law Group, LLP

(57) ABSTRACT

A design space analyzer generates a parametric model associated with a design problem. The design space analyzer then discretizes various parameters associated with the model and generates a plurality of sample designs using different combinations of discretized parameters. The design space analyzer also computes one or more metrics for each sample design. In this fashion, the design space analyzer generates a coarse approximation of the design space associated with the design problem. The design space analyzer then evaluates portions of that approximation, at both global and local scales, to identify portions of the design space that meet certain feasibility criteria. Finally, the design space analyzer modifies the design space to facilitate more efficient exploration during optimization.

20 Claims, 5 Drawing Sheets

(56) References Cited

U.S. PATENT DOCUMENTS

| | | | | |
|---|---|---|---|---|
| 8,473,895 | B2* | 6/2013 | Jackson | G06F 30/30 717/104 |
| 10,019,474 | B2* | 7/2018 | Mirabella | G06F 30/00 |
| 10,540,477 | B2* | 1/2020 | Nicolai | G06F 30/15 |
| 2008/0027878 | A1* | 1/2008 | Street | G06Q 20/0855 703/1 |
| 2009/0182695 | A1* | 7/2009 | Yanami | G06F 30/00 706/19 |

OTHER PUBLICATIONS

Lee, T.H. & Jung, J.J. "A Sampling Technique Enhancing Accuracy and Efficiency of Metamodel-Based RBDO: Constraint Boundary Sampling" Computers & Structures, vol. 86, pp. 1463-1476 (2008) (Year: 2008).*

Palermo, G., et al. "An Efficient Design Space Exploration Methodology for Multiprocessor SoC Architectures based on Response Surface Methods" IEEE Int'l Conf. on Embedded Computer Systems: Architectures Modeling & Simulation (2008) available from < https://ieeexplore.ieee.org/document/4664858> (Year: 2008).*

Krish, S. "A Practical Generative Design Method" Computer-Aided Design, vol. 43, pp. 88-100 (2011) (Year: 2011).*

Larson, B. & Mattson, C. "Design Space Exploration for Quantifying a System Model's Feasible Domain" J. Mechanical Design, vol. 134 (2012) (Year: 2012).*

Calixto et al., "A literature review for space planning optimization using an evolutionary algorithm approach: 1992-2014", Blucher Design Proceedings, vol. 2, No. 3, 2015, pp. 662-671.

Deb et al., "A Fast and Elitist Multiobjective Genetic Algorithm: NSGA-II", IEEE transactions on evolutionary computation, vol. 6, No. 2, Apr. 2002, pp. 182-197.

Flack et al., "Evolution of Architectural Floor Plans", Applications of Evolutionary Computation, Part II, LNCS 6625, 2011, pp. 313-322.

Homayouni, Hoda, "A Survey of Computational Approaches to Space Layout Planning (1965-2000)", Department of Architecture and Urban Planning University of Washington, 2000, pp. 1-18.

Marler et al., "Survey of multi-objective optimization methods for engineering", Structural and multidisciplinary optimization, vol. 26, No. 6, DOI10.1007/s00158-003-0368-6, Mar. 23, 2004, pp. 369-395.

Youmans et al., "Design fixation: Classifications and modern methods of prevention", Artificial Intelligence for Engineering Design, Analysis and Manufacturing, vol. 28, No. 2, doi:10.1017/S0890060414000043, 2014, pp. 129-137.

* cited by examiner

ANALYZING A DESIGN SPACE TO EFFECT MORE EFFICIENT DESIGN SPACE EXPLORATION

CROSS-REFERENCE TO RELATED APPLICATIONS

This application claims the benefit of United States Provisional Patent Application titled, "Design Space Model for Generative Space Planning in Architecture," filed on May 16, 2017 and having Ser. No. 62/507,141. The subject matter of this related application is hereby incorporated herein by reference.

BACKGROUND

Field of the Various Embodiments

The various embodiments relate generally to computer-aided design and, more specifically, to analyzing a design space to effect more efficient design space exploration.

Description of the Related Art

In a conventional design optimization workflow, a designer first generates a parametric model associated with a particular design problem that needs to be solved. The parametric model defines specific parameters that typically vary across the various candidate designs generated to address the design problem. The design space associated with the design problem includes all possible combinations of each of the different parameters. The designer also can generate one or more metrics that quantify particular characteristics of candidate designs that should be maximized or minimized. Finally, the designer configures an optimization algorithm to search the design space, using the one or more metrics for guidance, to generate multiple feasible design options that solve the design problem.

One drawback of the above approach is that conventional optimization algorithms typically expend excessive computational resources exploring regions of the design space that may include numerous infeasible designs. In fact, in extreme cases, a design space as a whole could include no feasible designs, and a conventional optimization algorithm would then spend hours or days exploring the entire design space to eventually conclude that no feasible design options exist.

As the foregoing illustrates, what is needed in the art are more techniques for exploring design spaces.

SUMMARY

Various embodiments include a computer-implemented method for automatically analyzing and generating design options to solve a design problem, the method comprising generating a first set of design options based on a first plurality of parametric values, wherein each design option included in the first set of design options corresponds to a different position within a first design space, analyzing the first set of design options to identify a first subset of design options that do not satisfy at least one feasibility criterion, wherein the first subset of design options corresponds to a first region within the first design space, generating a second design space from the first design space that excludes the first region, wherein the second design space includes more design options that satisfy the at least one feasibility criterion than the first design space, and causing an optimization algorithm to analyze the second design space and generate a second set of design options based the first plurality of parametric values.

At least one advantage of the disclosed techniques is that the design space can be explored in a much more efficient manner compared to conventional techniques. In particular, the design space analyzer determines which areas of the design space should be explored before costly optimization is performed. Subsequently, during optimization, computational resources are not expended exploring other regions. This approach reduces the amount of computational resources needed to perform optimization in proportion to the fraction of the design space that can be filtered out before optimization is performed. Accordingly, the disclosed techniques represent a technical advancement compared to conventional, less efficient techniques.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, conventional optimization algorithms waste computational resources exploring regions of a design space that include few feasible designs or exploring design spaces that are wholly infeasible. Consequently, the design process may consume an unreasonable amount of time and/or may not produce designs that maximize various metrics.

To address these issues, embodiments of the invention include a design space analyzer that generates a parametric model associated with a design problem. The design space analyzer then discretizes various parameters associated with the model and generates a plurality of sample designs using different combinations of discretized parameters. The design space analyzer also computes one or more metrics for each sample design. In this fashion, the design space analyzer generates a coarse approximation of the design space associated with the design problem.

The design space analyzer then evaluates portions of that approximation, at both global and local scales, to identify portions of the design space that meet certain feasibility criteria. The feasibility criteria may indicate that a given portion of the design space should include some degree of local variation and/or some degree of global variation. The design space analyzer generates design space modifications that, when applied to the design space, constrain exploration of the design space to avoid regions that do not meet the feasibility criteria. The design space analyzer then initiates an optimization algorithm to explore the modified design space, starting with any sample designs that maximize the various metrics.

At least one advantage of the techniques described above is that the design space can be explored in a much more efficient manner compared to conventional techniques. Because the design space analyzer identifies regions of the design space that include infeasible designs prior to optimization, computational resources can be conserved that would otherwise be wasted exploring those regions. Accordingly, the disclosed techniques represent a technical advancement compared to conventional, less efficient techniques.

System Overview

Figure 1:
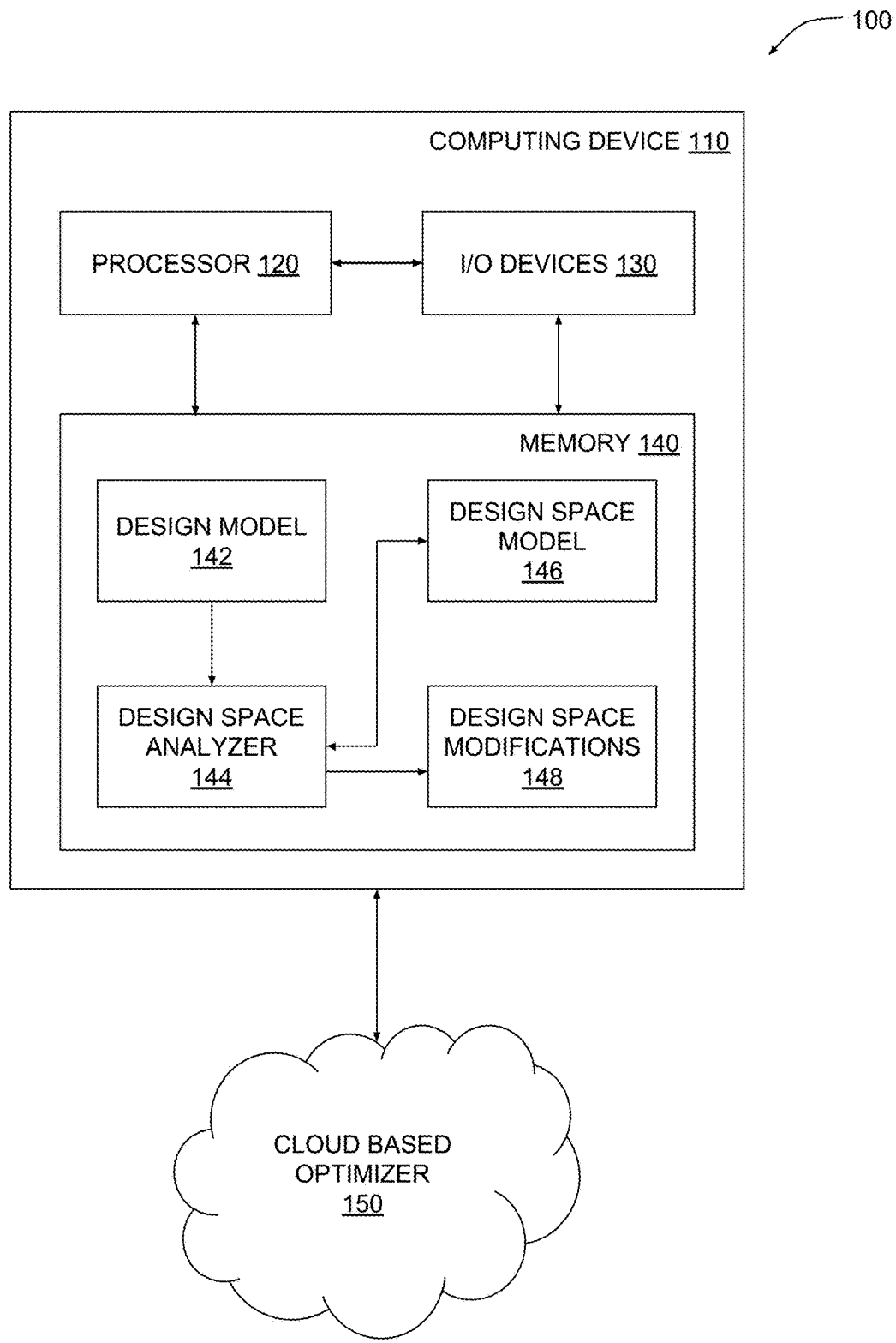
FIG. 1 illustrates a system configured to implement one or more aspects of the various embodiments.

FIG. 1 illustrates a system configured to implement one or more aspects of the present embodiments. As shown, a system 100 includes a client computing device 110 coupled to a cloud-based optimizer 150. Client computing device 110 includes a processor 120, input/output (I/O) devices 130, and memory 140.

Processor 120 includes any technically feasible set of hardware units configured to process data and execute software applications. For example, processor 120 could include one or more of a central processing unit (CPU), a graphics processing unit (GPU), and an application specific integrated circuit (ASICs). I/O devices 130 include any technically feasible set of devices configured to perform input and/or output operations, including, for example, a display device, a keyboard, a mouse, and a touchscreen, among others. Memory 140 includes any technically feasible set of storage media configured to store data and software applications, such as a hard disk, a random-access memory (RAM) module, and a read-only memory (ROM), for example.

Memory 140 includes a design model 142, a design space analyzer 144, a design space model 146, and design space modifications 148. Design model 142 is a parametric model describing a family of design options that address a given design problem. Design model 142 includes one or more different parameters that constrain various geometric properties of the family of design options. Design model 142 also indicates specific ranges of values for those different parameters.

For example, design model 142 could describe a family of design options associated with an architectural space planning problem. Design model 142 could include a set of parameters that describe the position and orientation of a set of pathways that transect a design area. The value of a given parameter in the set of parameters could define a location along a given boundary of the design area where a corresponding pathway terminates. Alternatively, the value of a given parameter could indicate the length of a corresponding pathway.

In this fashion, design model 142 establishes a framework of parameters that, when assigned particular values, produce a design option. The design space associated with the design problem includes all possible combinations of values for each of those different parameters, where a given combination of parameters corresponds to a particular design option.

Design space analyzer 144 is configured to generate various configurations of design model 142 in response to user input describing various design objectives and design constraints associated with the design problem. Design space analyzer 144 then generates, based on design model 142, design space model 146. Design space model 146 is a coarse approximation of the design space associated with the design problem. Design space analyzer 144 generates design space model 146 by discretizing the various parameters set forth in design model 142 and then generating sample designs derived from different combinations of those discretized parameters. Each sample design defines a discrete location in design space model 146.

In addition, design space analyzer 144 evaluates each sample design to compute one or more metrics. A metric computed for a given sample design represents a particular characteristic of the sample design. For example, in the context of architectural space planning, design space analyzer 144 could compute the level of interconnectivity provided by the pathway layout associated with each different sample design. Ultimately, these metrics can be used to guide an optimization algorithm when exploring the design space. However, before optimization occurs, design space analyzer 144 analyzes design space model 146 to improve the efficiency with which that design space can be explored.

Figure 3:
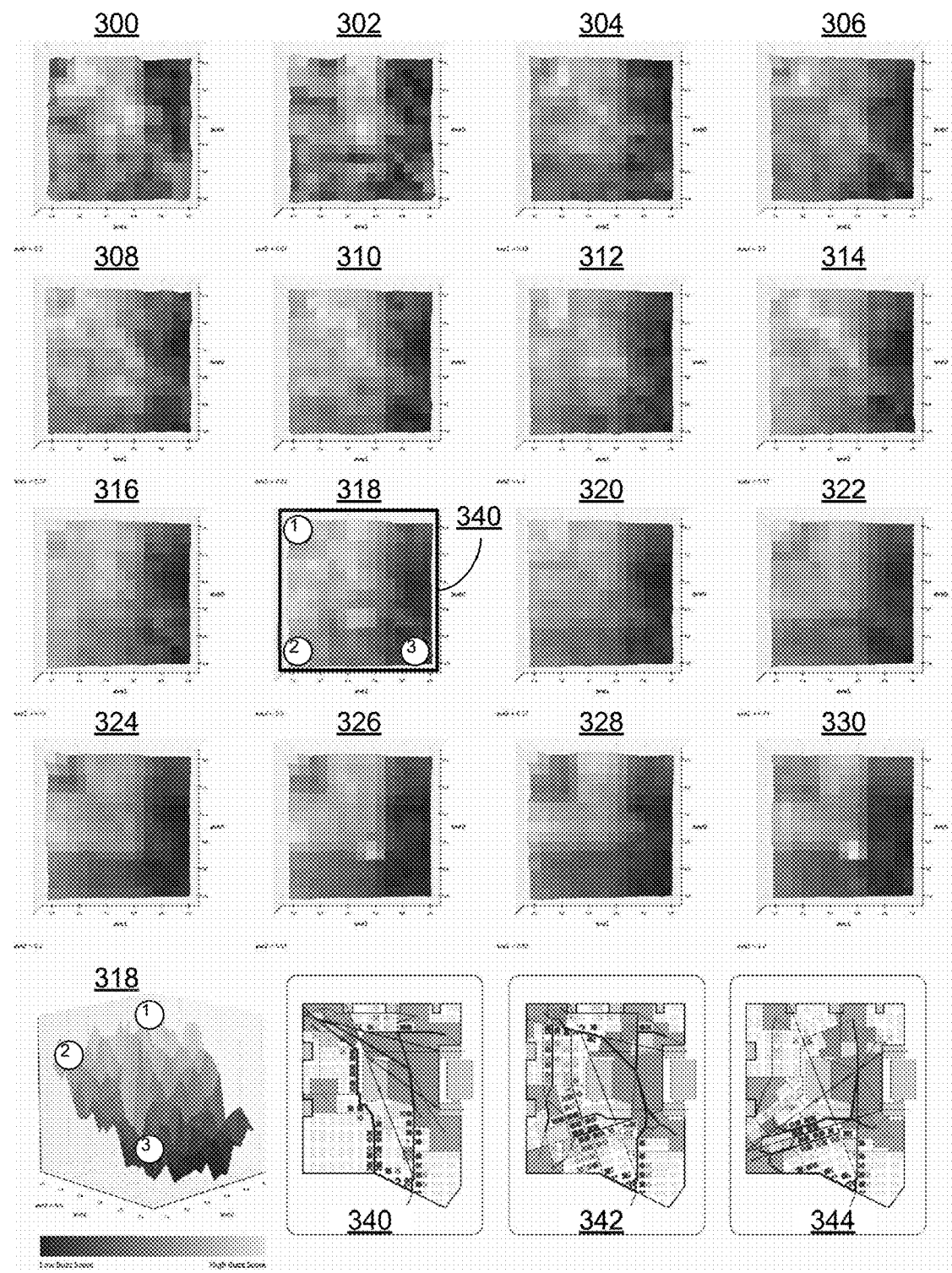
FIG. 3 illustrates how the design space analyzer of FIG. 1 performs a global analysis of a portion of a design space, according to various embodiments.
Figure 4:
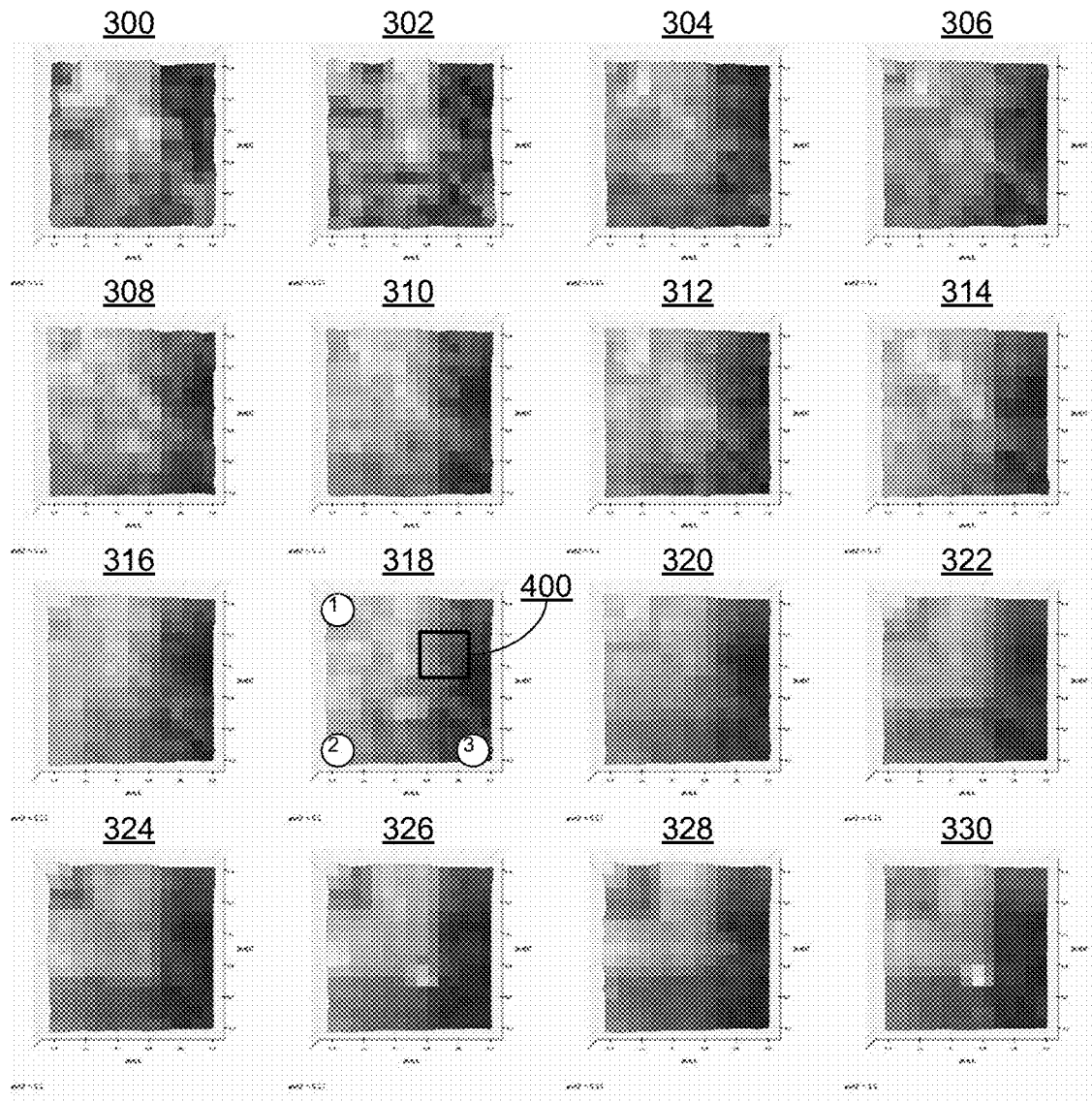
FIG. 4 illustrates how the design space analyzer of FIG. 1 performs a local analysis of a portion of a design space, according to various embodiments.

In particular, design space analyzer 144 evaluates design space model 146 to identify regions of that model meeting certain feasibility criteria. A given region of design space model 146 may correspond to particular combinations of parameters or specific sub-ranges of parametric values. A first feasibility criterion indicates that a given region of design space model 146 should have at least a threshold level of global variation across many separate sample designs. A second feasibility criterion indicates that a given region of design space model 146 should have at least a threshold level of local variation across a neighborhood of adjacent sample designs. FIGS. 3-4 illustrate how design space analyzer 144 evaluates regions of design space model 146.

Once design space analyzer 144 identifies regions of design space model 146 meeting the feasibility criteria and other regions that do not meet those criteria, design space analyzer 144 generates design space modification 148. Design space modifications 148 generally indicate regions of the design space that should be avoided during optimization. Such regions may include numerous infeasible designs or numerous designs with insufficient metric values. More specifically, design space modifications 148 indicate particular combinations of parameters or ranges of parameters that should not be evaluated during exploration of the design space during optimization. These modifications can be applied to adjust and/or constrain design model 142 so that during optimization, regions of the design space that include numerous unsuitable designs, or regions that are difficult to explore, are avoided.

In one embodiment, design space analyzer 144 may determine, based on design space model 146, that the design space does not include sufficient feasible designs to merit costly optimization. In such cases, design space analyzer 144 may re-parameterize design model 142 in order to expand the design space. Design space analyzer 144 may perform this process automatically or based on user input. For example, design space analyzer 144 may remove parameters which do not have a substantial effect on the performance of the explored design options, or combine several related parameters into a single parameter, thereby increasing the efficiency of the optimization process.

Design space analyzer 144 initiates optimization by transmitting design model 142 and design space modifications 148 to cloud-based optimizer 150. Design space analyzer 144 may also seed optimization with sample designs having the highest metrics. In this manner, design space analyzer 144 can "warm start" optimization, thereby further improving the efficiency of design space optimization.

According to the techniques described above, design space analyzer 144 improves design space exploration by (i) modifying the design space so that exploration of the design space is more focused on feasible designs, and (ii) warm-starting exploration of the design space with known feasible designs. Thus, the techniques described herein represent a significant advance compared to conventional approaches that may needlessly waste computational resources. Design space analyzer 144 includes specific modules configured to implement the above features, as described in greater detail below in conjunction with FIG. 2.

Figure 2:
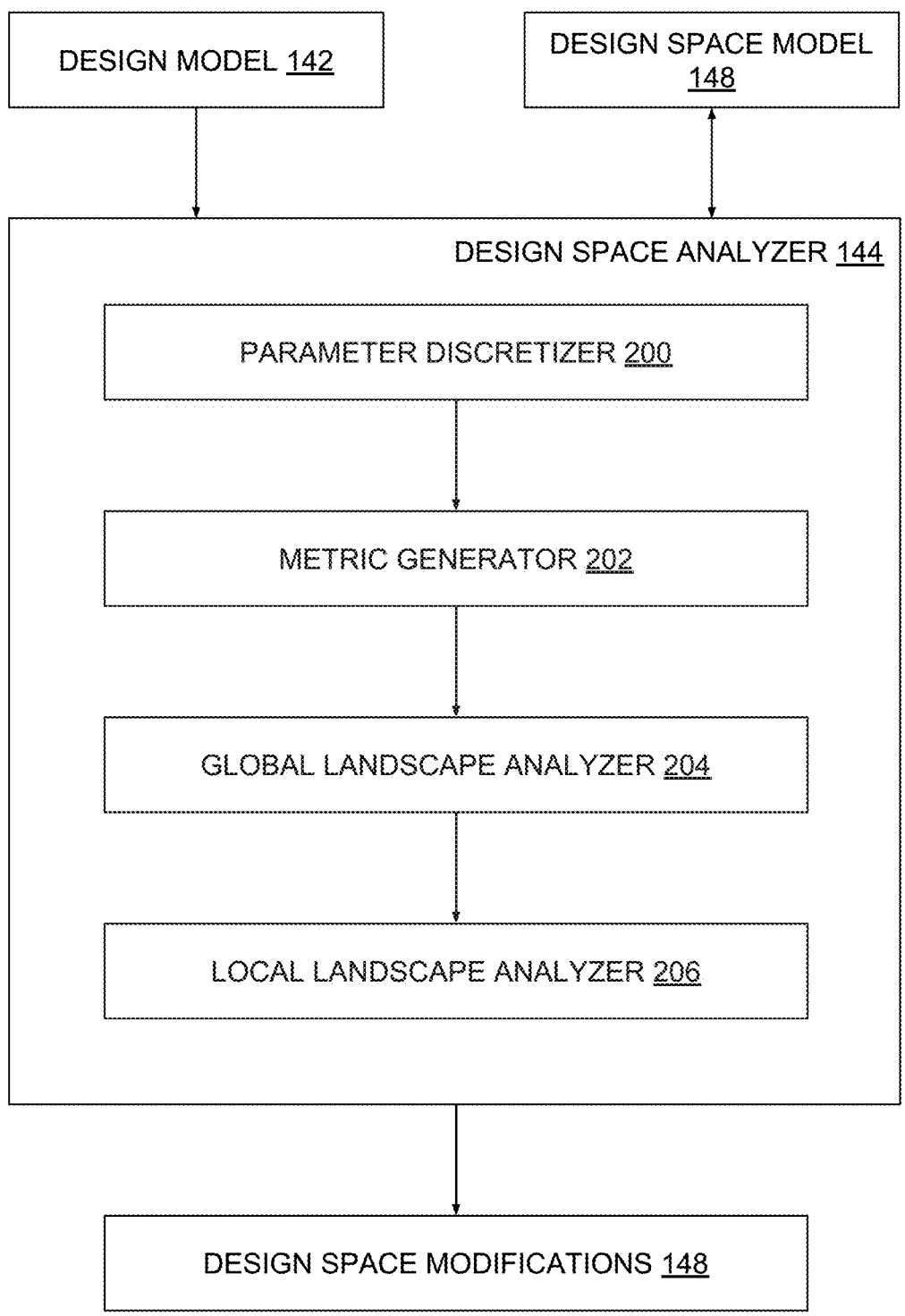
FIG. 2 is a more detailed illustration of the design space analyzer of FIG. 1, according to various embodiments.

FIG. 2 is a more detailed illustration of the design space analyzer of FIG. 1, according to various embodiments. As shown, design space analyzer 144 includes parameter discretizer 200, metric generator 202, global landscape analyzer 204, and local landscape analyzer 206. The various modules shown interoperate with one another to generate design space model 146 and design space modifications 148, as also described above in conjunction with FIG. 1.

In operation, parameter discretizer 200 processes design model 142 and then discretizes the various parameters set forth in that model. In doing so, parameter discretizer 200 may identify a range of values associated with a given parameter, and then generate a set of N discrete values to represent that range, N being an integer. Parameter discretizer 200 may also perform a combinatorial process to generate some or all possible combinations of discretized parameters, where each combination corresponds to a sample design and to a location within design space model 146.

Metric generator 202 evaluates each location of design space model 146 and then computes one or more metrics for the sample designs corresponding to those locations. A given metric may quantify a particular characteristic of a sample design. For example, in the context of architectural space planning, an "adjacency" metric could quantify the average proximity between fixtures in an office space. In a related example, an "interconnectivity" metric could quantify the interconnectedness of pathways within that office space.

Global landscape analyzer 204 analyzes regions of design space model 146, based on the metrics computed by metric generator 202, and then determines the degree to which each region meets certain global feasibility criteria. As discussed above, the global feasibility criteria may relate to the variance of sample designs across a given region of design space model 146.

Local landscape analyzer 206 analyzes regions of design space model 146, based on the metrics computed by metric generator 202, and then determines the degree to which each region meets certain local feasibility criteria. As mentioned in conjunction with FIG. 1, the local feasibility criteria may relate to the variance of sample designs across local neighborhoods within a given region of design space model 146.

Based on the analyses performed in the manner discussed above, design space analyzer 144 generates design space modifications 148. Design space analyzer 144 may adjust design model 142 to exclude regions of design space during optimization, thereby improving the efficiency with which an optimization algorithm can explore that design space. Design space analyzer 142 also identifies any sample designs that maximize the metrics computed by metric generator 202, and then initializes optimization based on these sample designs, thereby further improving the optimization process. FIGS. 3 and 4 illustrate how global landscape analyzer 204 and local landscape analyzer 206, respectively, analyze regions of design space model 146.

Exemplary Design Space Analysis

FIG. 3 illustrates how the design space analyzer of FIG. 1 performs a global analysis of a portion of a design space, according to various embodiments. As shown, design space analyzer 144 generates a plurality of regions of design space model 146, including regions 300, 302, 304, 306, 308, 310, 312, 314, 316, 318, 320, 322, 324, 326, 328, and 330. Each region is defined by a different set of parametric values. The parametric values for a given region may be constrained to a finite number of discrete values, constrained to a single discrete value, or selected randomly. With the exemplary regions shown, the horizontal axis reflects a range of discrete values for a first parameter, the vertical axis reflects a range of discrete values for a second parameter, and a third parameter is fixed to a different discrete value for each different region. In one embodiment, other parameters are randomly selected.

Each position within a given region corresponds to a different sample design. Design space analyzer 144 computes one or more metrics for each sample design as described above in conjunction with FIG. 1-2. As shown here, the value of one exemplary metric is depicted via shading for each sample design within each region. Lighter shading indicates a higher value for the metric, while darker shading indicates a lower value for the metric. For example, the upper left corner of region 318 includes sample designs with higher metric values, while the lower right corner of region 318 includes sample designs with lower metric values. Region 318 is also depicted in three dimensions, where higher portions of region 318 represent greater metric values and lower portions represent lower metric values. In one embodiment, the metric values associated with a given region are averaged across different random samplings of specific parametric values.

Design space analyzer 144 determines the variation of metric values within each region in order to determine, for any given region, whether the region meets the global feasibility criterion. Design space analyzer 144 identifies the corners of each region within a global bounding box, and then compares the metric values at those corners. For example, in region 318, design space analyzer 144 could identify corners 1, 2, and 3 within bounding box 340 and then compare the metric values at those corners. Each corner generally corresponds to a sample design. In this example, corners 1, 2, and 3 correspond to sample designs 340, 342, and 344. In one embodiment, design space analyzer 144 computes the standard deviation of metric values across all sample designs within a given region and then determines whether the standard deviation exceeds a threshold. When the threshold is exceeded, the global feasibility criterion is met.

Design space analyzer 144 performs the above process for each region of design space model 146 to distinguish between regions that meet the global feasibility criterion and other regions that do not. Generally, the purpose of analyzing regions in this manner is to prevent the exploration of regions that have too little or too much variation. Regions with too little variation are biased and cannot produce designs with improving metric values. These regions may be computationally wasteful to explore. Regions with too much variation have an unpredictable landscape, and so the direction of exploration cannot be determined in a meaningful way. Design space analyzer 144 also performs a similar process within local neighborhoods of each region, as described below in conjunction with FIG. 4.

FIG. 4 illustrates how the design space analyzer of FIG. 1 performs a local analysis of a portion of a design space, according to various embodiments. As shown, design space analyzer 144 generates a local bounding box 400 within region 318 and then evaluates the local feasibility criterion within that bounding box. Design space analyzer 144 may slide local bounding box 400 across numerous portions of region 318 and evaluate the local feasibility criterion for each portion. In one embodiment, design space analyzer 318 computes the standard deviation of the metric values across each sample design within local bounding box 400 at each location. Then, design space analyzer 144 averages all standard deviations and compares the resultant average to a threshold. When the threshold is exceeded, the local feasibility criterion is met.

Design space analyzer 144 performs the above process for each region of design space model 146 to determine the degree to which each region meets the local feasibility criterion and whether that degree exceeds the feasibility threshold. The purpose of analyzing regions of design space model 146 in this manner is to identify regions with sufficient structure to allow efficient exploration during optimization. Regions with no local variation or too much local variation can be difficult, and potentially inefficient, to explore. Design space analyzer 144 identifies these regions before optimization begins and can avoid the exploration of these regions.

Referring generally to FIGS. 3-4, design space analyzer 144 evaluates each region of design space model 146 relative to the global and local feasibility criteria and for each computed metric, then generates design space modifications 148 to constrain exploration of the design space. These modifications may restrict the different parametric values from assuming specific ranges associated with infeasible or sub-optimal designs. Persons skilled in the art will understand that although the examples discussed in conjunction with FIGS. 3-4 include three discretized parameters, the above-described techniques can be applied to any multidimensional design space, as well.

Design space analyzer 144 collects the sample designs with the highest metric values and then initiates an optimization process to explore the modified design space. The various steps performed by design space analyzer 144 are described in stepwise fashion below in conjunction with FIG. 5.

Procedure for Modifying a Design Space

Figure 5:
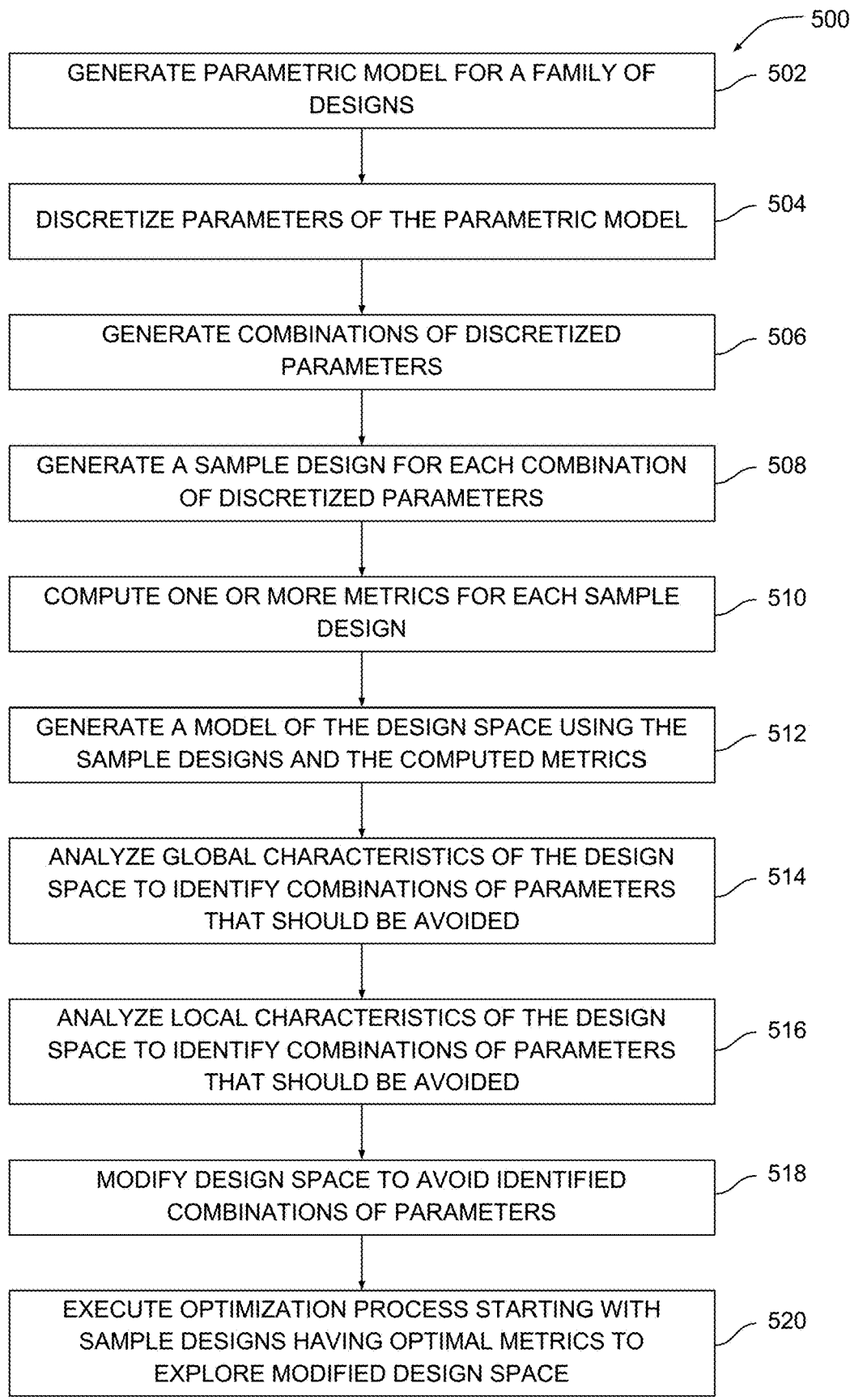
FIG. 5 is a flow diagram of method steps for analyzing a design space to effect more efficient design space exploration, according to various embodiments.

FIG. 5 is a flow diagram of method steps for modifying a design space to facilitate more efficient exploration, according to various embodiments. Although the method steps are described in conjunction with the systems of FIGS. 1-4, persons skilled in the art will understand that any system may be configured to perform the method steps in any order.

As shown, a method 500 begins at step 502, where design space analyzer 144 generates a parametric model for a family of designs. The parametric model indicates specific ranges for a plurality of parameters that define geometry for a given design in the family of designs.

At step 504, design space analyzer 144 discretizes parameters of the parametric model. In doing so, design space analyzer 144 may generate a finite set of discrete values for each different parameter. At step 506, design space analyzer 144 generates different combinations of discretized parameters. At step 508, design space analyzer 144 generates a sample design for each combination of discretized parameters. At step 510, design space analyzer 144 computes one or more metrics for each sample design. A given metric quantifies a particular characteristic of a given design. At step 512, design space analyzer 144 generates a model of the design space using the sample designs and the computed metrics.

At step 514, design space analyzer 144 analyzes global characteristics of the design space to identify combinations of parameters that should be avoided. Design space analyzer 144 could, for example, evaluate the standard deviation of metric values across all sample designs within a given region. At step 516, design space analyzer 144 analyzes local characteristics of the design space to identify combinations of parameters that should be avoided. For example, design space analyzer 144 could evaluate the standard deviation of metric values within a local neighborhood and average the standard deviation across many such neighborhoods within the region. At step 518, design space analyzer 144 modifies the design space to avoid identified combinations of parameters. Design space analyzer 144 may constrain the parametric values evaluated at any given step of optimization to avoid assuming particular combinations of parameters that yield infeasible designs or designs with insufficient metric values. At step 520, design space analyzer 144 execute an optimization process starting with sample designs having optimal metrics to explore the modified design space. Accordingly, design space analyzer 144 improves upon conventional, inefficient optimization techniques.

In sum, a design space analyzer generates a parametric model associated with a design problem. The design space analyzer discretizes various parameters associated with the model and generates a plurality of sample designs using different combinations of discretized parameters. The design space analyzer also computes one or more metrics for each sample design. In this fashion, the design space analyzer generates a coarse approximation of the design space associated with the design problem. The design space analyzer then evaluates portions of that approximation, at both global and local scales, to identify portions of the design space that meet certain feasibility criteria. The feasibility criteria may indicate that a given portion of the design space should include some degree of local variation and/or some degree of global variation. The design space analyzer generates design space modifications that, when applied to the design space, constrain exploration of the design space to avoid regions that do not meet the feasibility criteria. The design space analyzer initiates an optimization algorithm to explore the modified design space, starting with the sample designs with optimal metrics.

At least one advantage of the disclosed techniques is that the design space can be explored in a much more efficient manner compared to conventional techniques. Because the design space analyzer identifies regions of the design space that include infeasible designs prior to optimization, computational resources can be conserved that would otherwise be wasted exploring those regions. In particular, the design space analyzer determines which areas of the design space should be explored before costly optimization is performed. Subsequently, during optimization, computational resources are not expended exploring other regions. This approach reduces the amount of computational resources needed to perform optimization in proportion to the fraction of the design space that can be filtered out before optimization is performed. Accordingly, the disclosed techniques represent a technical advancement compared to conventional, less efficient techniques.

1. Some embodiments include a method for automatically analyzing and generating design options to solve a design problem, the method comprising: generating a first set of design options based on a first plurality of parametric values, wherein each design option included in the first set of design options corresponds to a different position within a first design space; analyzing the first set of design options to identify a first subset of design options that do not satisfy at least one feasibility criterion, wherein the first subset of design options corresponds to a first region within the first design space; generating a second design space from the first design space that excludes the first region, wherein the second design space includes more design options that satisfy the at least one feasibility criterion than the first design space; and causing an optimization algorithm to analyze the second design space and generate a second set of design options based the first plurality of parametric values.

2. The computer-implemented method of clause 1, further comprising: generating a first design model that includes a first range of parametric values and a second range of parametric values; discretizing the first range of parametric values to generate the first plurality of parametric values; and discretizing the second range of parametric values to generate a second plurality of parametric values.

3. The computer-implemented method of any of clauses 1 and 2, wherein generating a given design option included in the first set of design options comprises: determining a first parametric value included in the first plurality of parametric values; and determining a second parametric value included in the second plurality of parametric values, wherein only the given design option is associated with the first parametric value and the second parametric value.

4. The computer-implemented method of any of clauses 1, 2, and 3, further comprising computing a metric value for each design option included in the first set of design options, wherein a given metric value quantifies at least one characteristic associated with a given design option.

5. The computer-implemented method of any of clauses 1, 2, 3, and 4, wherein analyzing the first set of design options to identify the first subset of design options comprises: computing a measure of variation across all metric values associated with the first subset of design options; and determining that the measure of variation does not exceed a threshold value, wherein the measure of variation corresponds to the at least one feasibility criterion.

6. The computer-implemented method of any of clauses 1, 2, 3, 4, and 5, wherein analyzing the first set of design options to identify the first subset of design options comprises: computing a measure of variation for each neighborhood of design options included in the subset of design options, wherein a given neighborhood of design options includes any design options adjacent to a given design option; averaging the measure of variation across all neighborhoods of design options to generate an average measure of variation; and determining that the average measure of variation does not exceed a threshold value, wherein the measure of variation corresponds to the at least one feasibility criterion.

7. The computer-implemented method of any of clauses 1, 2, 3, 4, 5, and 6, wherein generating a second design space from the first design space that excludes the first region comprises constraining a range of parametric values associated with a first design model to exclude one or more parametric values associated with the first region.

8. The computer-implemented method of any of clauses 1, 2, 3, 4, 5, 6, and 7, wherein causing the optimization algorithm to analyze the second design space and generate the second set of design options comprises: computing a metric value for each design option included in the first set of design options; identifying a first design option that maximizes the metric value compared to other design options; and initializing the optimization algorithm to analyze the second design space based on the first design option.

9. The computer-implemented method of any of clauses 1, 2, 3, 4, 5, 6, 7, and 8, wherein at least one design option included in the second set of design options maximizes a first metric compared to at least one design option included in the first set of design options.

10. The computer-implemented method of any of clauses 1, 2, 3, 4, 5, 6, 7, 8, and 9, wherein the first plurality of parametric values constrains placement of a set of pathways that transect a given design option in the first set of design options.

11. Some embodiments include a non-transitory computer-readable medium that, when executed by a processor, causes the processor to automatically analyze and generate design options to solve a design problem by performing the steps of: generating a first set of design options based on a first plurality of parametric values, wherein each design option included in the first set of design options corresponds to a different position within a first design space; analyzing the first set of design options to identify a first subset of design options that do not satisfy at least one feasibility criterion, wherein the first subset of design options corresponds to a first region within the first design space; generating a second design space from the first design space that excludes the first region, wherein the second design space includes more design options that satisfy the at least one feasibility criterion than the first design space; and causing an optimization algorithm to analyze the second design space and generate a second set of design options based the first plurality of parametric values.

12. The non-transitory computer-readable medium of clause 11, further comprising the steps of: generating a first design model that includes a first range of parametric values and a second range of parametric values; discretizing the first range of parametric values to generate the first plurality of parametric values; and discretizing the second range of parametric values to generate a second plurality of parametric values.

13. The non-transitory computer-readable medium of any of clauses 11 and 12, wherein generating a given design option included in the first set of design options comprises: determining a first parametric value included in the first plurality of parametric values; and determining a second parametric value included in the second plurality of parametric values, wherein only the given design option is associated with the first parametric value and the second parametric value.

14. The non-transitory computer-readable medium of any of clauses 11, 12, and 13, further comprising the step of computing a metric value for each design option included in the first set of design options, wherein a given metric value quantifies at least one characteristic associated with a given design option.

15. The non-transitory computer-readable medium of any of clauses 11, 12, 13, and 14, wherein the step of analyzing the first set of design options to identify the first subset of design options comprises: computing a measure of variation across all metric values associated with the first subset of design options; and determining that the measure of variation does not exceed a threshold value, wherein the measure of variation corresponds to the at least one feasibility criterion.

16. The non-transitory computer-readable medium of any of clauses 11, 12, 13, 14, and 15, wherein the step of analyzing the first set of design options to identify the first subset of design options comprises: computing a measure of variation for each neighborhood of design options included in the subset of design options, wherein a given neighborhood of design options includes any design options adjacent to a given design option; averaging the measure of variation across all neighborhoods of design options to generate an average measure of variation; and determining that the average measure of variation does not exceed a threshold value, wherein the measure of variation corresponds to the at least one feasibility criterion.

17. The non-transitory computer-readable medium of any of clauses 11, 12, 13, 14, 15, and 16, wherein the step of generating a second design space from the first design space that excludes the first region comprises constraining a range of parametric values associated with a first design model to exclude one or more parametric values associated with the first region.

18. The non-transitory computer-readable medium of any of clauses 11, 12, 13, 14, 15, 16, and 17, wherein the step of causing the optimization algorithm to analyze the second design space and generate the second set of design options comprises: computing a metric value for each design option included in the first set of design options; identifying a first design option that maximizes the metric value compared to other design options; and initializing the optimization algorithm to analyze the second design space based on the first design option, wherein at least one design option included in the second set of design options maximizes the metric compared to the first design option.

19. The non-transitory computer-readable medium of any of clauses 11, 12, 13, 14, 15, 16, 17, and 18, wherein a first parametric value included in the plurality of parametric values indicates a position and an orientation for a first pathway included in a first design option included in the plurality of design options.

20. Some embodiments include a system, comprising: a memory storing a design space analyzer; and a processor that, when executing the design space analyzer is configured to perform the steps of: generating a first set of design options based on a first plurality of parametric values, wherein each design option included in the first set of design options corresponds to a different position within a first design space, analyzing the first set of design options to identify a first subset of design options that do not satisfy at least one feasibility criterion, wherein the first subset of design options corresponds to a first region within the first design space, generating a second design space from the first design space that excludes the first region, wherein the second design space includes more design options that satisfy the at least one feasibility criterion than the first design space, and causing an optimization algorithm to analyze the second design space and generate a second set of design options based the first plurality of parametric values.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically analyzing and generating design options to solve a design problem, the method comprising:
    generating a first set of design options based on a first plurality of parametric values for a first set of design parameters, wherein each design option included in the first set of design options corresponds to a different position within a first design space;
    analyzing the first set of design options to identify a first subset of design options that do not satisfy at least one feasibility criterion, wherein the first subset of design options corresponds to a first region within the first design space;
    generating a second design space based on the first design space for a second set of design parameters, wherein the second set of design parameters is different than the first set of design parameters, and wherein the second design space excludes the first region and includes more design options that satisfy the at least one feasibility criterion than the first design space; and
    causing an optimization algorithm to analyze the second design space and generate a second set of design options based on the first plurality of parametric values.

2. The computer-implemented method of claim 1, further comprising:
    generating a first design model that includes a first range of parametric values and a second range of parametric values;
    discretizing the first range of parametric values to generate the first plurality of parametric values; and
    discretizing the second range of parametric values to generate a second plurality of parametric values.

3. The computer-implemented method of claim 2, wherein generating a given design option included in the first set of design options comprises:
    determining a first parametric value included in the first plurality of parametric values; and
    determining a second parametric value included in the second plurality of parametric values, wherein only the given design option is associated with the first parametric value and the second parametric value.

4. The computer-implemented method of claim 1, further comprising computing a metric value for each design option included in the first set of design options, wherein a given metric value quantifies at least one characteristic associated with a given design option.

5. The computer-implemented method of claim 4, wherein analyzing the first set of design options to identify the first subset of design options comprises:
    computing a measure of variation across all metric values associated with the first subset of design options; and
    determining that the measure of variation does not exceed a threshold value, wherein the measure of variation corresponds to the at least one feasibility criterion.

6. The computer-implemented method of claim 4, wherein analyzing the first set of design options to identify the first subset of design options comprises:
    computing a measure of variation for each neighborhood of design options included in the subset of design options, wherein a given neighborhood of design options includes any design options adjacent to a given design option;
    averaging the measure of variation across all neighborhoods of design options to generate an average measure of variation; and
    determining that the average measure of variation does not exceed a threshold value, wherein the measure of variation corresponds to the at least one feasibility criterion.

7. The computer-implemented method of claim 1, wherein generating the second design space based on the first design space for the second set of design parameters comprises constraining a range of parametric values associated with the second set of design parameters to exclude one or more parametric values associated with the first region.

8. The computer-implemented method of claim 1, wherein causing the optimization algorithm to analyze the second design space and generate the second set of design options comprises:
    computing a metric value for each design option included in the first set of design options;
    identifying a first design option that maximizes the metric value compared to other design options; and
    initializing the optimization algorithm to analyze the second design space based on the first design option.

9. The computer-implemented method of claim 1, wherein at least one design option included in the second set of design options maximizes a first metric compared to at least one design option included in the first set of design options.

10. The computer-implemented method of claim 1, wherein the first plurality of parametric values constrains placement of a set of pathways that transect a given design option in the first set of design options.

11. One or more non-transitory computer-readable media that, when executed by one or more processors, causes the one or more processors to automatically analyze and generate design options to solve a design problem by performing the steps of:
    generating a first set of design options based on a first plurality of parametric values for a first set of design parameters, wherein each design option included in the first set of design options corresponds to a different position within a first design space;
    analyzing the first set of design options to identify a first subset of design options that do not satisfy at least one feasibility criterion, wherein the first subset of design options corresponds to a first region within the first design space;

generating a second design space based on the first design space for a second set of design parameters, wherein the second set of design parameters is different than the first set of design parameters, and wherein the second design space excludes the first region and includes more design options that satisfy the at least one feasibility criterion than the first design space; and causing an optimization algorithm to analyze the second design space and generate a second set of design options based on the first plurality of parametric values.

12. The one or more non-transitory computer-readable media of claim 11, further comprising the steps of:
generating a first design model that includes a first range of parametric values and a second range of parametric values;
discretizing the first range of parametric values to generate the first plurality of parametric values; and
discretizing the second range of parametric values to generate a second plurality of parametric values.

13. The one or more non-transitory computer-readable media of claim 12, wherein generating a given design option included in the first set of design options comprises:
determining a first parametric value included in the first plurality of parametric values; and
determining a second parametric value included in the second plurality of parametric values, wherein only the given design option is associated with the first parametric value and the second parametric value.

14. The one or more non-transitory computer-readable media of claim 11, further comprising the step of computing a metric value for each design option included in the first set of design options, wherein a given metric value quantifies at least one characteristic associated with a given design option.

15. The one or more non-transitory computer-readable media of claim 14, wherein the step of analyzing the first set of design options to identify the first subset of design options comprises:
computing a measure of variation across all metric values associated with the first subset of design options; and
determining that the measure of variation does not exceed a threshold value, wherein the measure of variation corresponds to the at least one feasibility criterion.

16. The one or more non-transitory computer-readable media of claim 14, wherein the step of analyzing the first set of design options to identify the first subset of design options comprises:
computing a measure of variation for each neighborhood of design options included in the subset of design options, wherein a given neighborhood of design options includes any design options adjacent to a given design option;
averaging the measure of variation across all neighborhoods of design options to generate an average measure of variation; and determining that the average measure of variation does not exceed a threshold value, wherein the measure of variation corresponds to the at least one feasibility criterion.

17. The one or more non-transitory computer-readable media of claim 11, wherein the step of generating the second design space based on the first design space for the second set of design parameters comprises constraining a range of parametric values associated with the second set of design parameters to exclude one or more parametric values associated with the first region.

18. The one or more non-transitory computer-readable media of claim 11, wherein the step of causing the optimization algorithm to analyze the second design space and generate the second set of design options comprises:
computing a metric value for each design option included in the first set of design options;
identifying a first design option that maximizes the metric value compared to other design options; and
initializing the optimization algorithm to analyze the second design space based on the first design option, wherein at least one design option included in the second set of design options maximizes the metric compared to the first design option.

19. The one or more non-transitory computer-readable media of claim 11, wherein a first parametric value included in the plurality of parametric values indicates a position and an orientation for a first pathway included in a first design option included in the plurality of design options.

20. A system, comprising:
one or more memories storing a design space analyzer; and
one or more processors that, when executing the design space analyzer, are configured to perform the steps of:
generating a first set of design options based on a first plurality of parametric values for a first set of design parameters, wherein each design option included in the first set of design options corresponds to a different position within a first design space,
analyzing the first set of design options to identify a first subset of design options that do not satisfy at least one feasibility criterion, wherein the first subset of design options corresponds to a first region within the first design space,
generating a second design space based on the first design space for a second set of design parameters, wherein the second set of design parameters is different than the first set of design parameters, and wherein the second design space excludes the first region and includes more design options that satisfy the at least one feasibility criterion than the first design space, and
causing an optimization algorithm to analyze the second design space and generate a second set of design options based on the first plurality of parametric values.

* * * * *